(12) United States Patent
Zhuang et al.

(10) Patent No.: US 9,014,756 B2
(45) Date of Patent: Apr. 21, 2015

(54) INTELLIGENT TERMINAL THAT ALLOWS FOR REPLACEMENT OF A WIRELESS COMMUNICATION DEVICE BY A USER

(75) Inventors: Xianming Zhuang, Guangdong (CN); Ruyun Gan, Guangdong (CN); Ronald Xuelong Hu, Guangdong (CN); Shiqing Zhao, Guangdong (CN); Dexiang Edward Luo, Guangdong (CN); Jizhong Li, Guangdong (CN); Paola Pinnavaia, Guangdong (CN); Vittorio DiMauro, Guangdong (CN)

(73) Assignee: Huizhou TCL Mobile Communication Co., Ltd., Guangdong (CN)

( * ) Notice: Subject to any disclaimer, the term of this patent is extended or adjusted under 35 U.S.C. 154(b) by 240 days.

(21) Appl. No.: 13/521,338

(22) PCT Filed: May 17, 2012

(86) PCT No.: PCT/CN2012/075674
§ 371 (c)(1),
(2), (4) Date: Jul. 10, 2012

(87) PCT Pub. No.: WO2013/143213
PCT Pub. Date: Oct. 3, 2013

(65) Prior Publication Data
US 2014/0038533 A1    Feb. 6, 2014

(30) Foreign Application Priority Data

Mar. 31, 2012    (CN) .......................... 2012 1 0095230

(51) Int. Cl.
*H04B 1/38*    (2006.01)
*G06F 1/16*    (2006.01)

(52) U.S. Cl.
CPC ............ *H04B 1/3816* (2013.01); *G06F 1/1656* (2013.01); *G06F 1/1698* (2013.01)

(58) Field of Classification Search
CPC ........... H04B 1/3816; H04M 2250/14; H04W 88/02; H04W 8/183; H04W 12/06
USPC .............. 455/558, 90.2, 557, 575.1; 375/222; 439/630
See application file for complete search history.

(56) References Cited

U.S. PATENT DOCUMENTS

| | | | | |
|---|---|---|---|---|
| 5,061,845 | A * | 10/1991 | Pinnavaia | 235/492 |
| 6,053,748 | A * | 4/2000 | Bricaud et al. | 439/76.1 |
| 7,354,285 | B1 * | 4/2008 | Lin | 439/160 |
| 2002/0160661 | A1 * | 10/2002 | Florescu | 439/630 |

(Continued)

*Primary Examiner* — Nay A Maung
*Assistant Examiner* — Erica Fleming-Hall
(74) *Attorney, Agent, or Firm* — Bacon & Thomas, PLLC

(57) ABSTRACT

An intelligent terminal that allows for replacement of a wireless communication device by a user is disclosed, which comprises an intelligent terminal body and the wireless communication device having a SIM card. The wireless communication device is detachably inserted in a slot of the intelligent terminal body and connected to the intelligent terminal body via an interface, and the outer surface of the wireless communication device matches with the outer surface of the intelligent terminal body, such that the wireless network accessing function of the ultra-thin intelligent terminal is ensured even when no WiFi or 4G network resources are available. Meanwhile, this intelligent terminal can prevent the wireless network accessing device from being subjected to external impact and the consequent damage on the interface. Moreover, the detachable wireless communication device also makes it convenient for the user to choose different kinds of wireless network accessing devices freely.

5 Claims, 2 Drawing Sheets

(56) References Cited

U.S. PATENT DOCUMENTS

| | | | |
|---|---|---|---|
| 2004/0092149 A1* | 5/2004 | Scuteri et al. | 439/326 |
| 2006/0046544 A1* | 3/2006 | Ujii et al. | 439/159 |
| 2006/0121941 A1* | 6/2006 | Shiflett | 455/558 |
| 2006/0155913 A1* | 7/2006 | Nishikawa et al. | 711/100 |
| 2007/0173123 A1* | 7/2007 | Thornton et al. | 439/630 |
| 2008/0113687 A1* | 5/2008 | Prendergast et al. | 455/558 |
| 2008/0182622 A1* | 7/2008 | Makarowski et al. | 455/558 |
| 2008/0253313 A1* | 10/2008 | Carlton et al. | 370/313 |
| 2009/0042410 A1* | 2/2009 | Ujii et al. | 439/62 |
| 2009/0124216 A1* | 5/2009 | Lintern et al. | 455/90.1 |
| 2009/0270127 A1* | 10/2009 | Kakimoto | 455/558 |
| 2010/0304758 A1* | 12/2010 | Bury | 455/456.1 |
| 2011/0157846 A1* | 6/2011 | Xiao et al. | 361/752 |
| 2011/0177842 A1* | 7/2011 | Prendergast et al. | 455/558 |
| 2011/0255252 A1* | 10/2011 | Sloey et al. | 361/752 |
| 2012/0071152 A1* | 3/2012 | Roundtree et al. | 455/419 |
| 2012/0099265 A1* | 4/2012 | Reber | 361/679.26 |
| 2012/0099266 A1* | 4/2012 | Reber et al. | 361/679.26 |
| 2012/0196652 A1* | 8/2012 | Lee et al. | 455/557 |
| 2012/0196654 A1* | 8/2012 | Jin et al. | 455/558 |
| 2012/0295663 A1* | 11/2012 | Son et al. | 455/557 |
| 2012/0302224 A1* | 11/2012 | Schreiner et al. | 455/418 |

* cited by examiner

INTELLIGENT TERMINAL THAT ALLOWS FOR REPLACEMENT OF A WIRELESS COMMUNICATION DEVICE BY A USER

FIELD

The present invention relates to the technical field of intelligent terminals such as tablet computers, notebook computers and intelligent television (TV) sets, and more particularly, to an intelligent terminal that allows for replacement with a 3G or LTE wireless communication device when no free WiFi network resource is available.

BACKGROUND

Nowadays, with widespread use and rapid development of tablet computers, more and more consumers prefer to use tablet computers rather than mobile phones to access the Internet because the tablet computers have larger screens than the mobile phones.

However, the tablet computers are all made to be relatively thin, and for reasons of the cost, the thickness and the structure, it is usually difficult to dispose modules within the computer body that support wireless network accessing functions other than the WiFi (wireless fidelity) network accessing function.

Therefore, when a user moves from an environment having WiFi network resources into an environment without WiFi network resources or from an environment having a 4G network into an environment having no 4G network, the tablet computer will become unable to access the Internet through wireless communication. This greatly degrades utility of the tablet computer.

Accordingly, there is an urgent need for an ultra-thin wireless communication device which, as an optional accessory of a tablet computer, can be installed into the ultrathin body of the tablet computer so that the tablet computer can also support the other wireless network accessing functions beside the WiFi function.

SUMMARY

To solve the aforesaid technical problem, the present invention provides an intelligent terminal that allows for replacement of a wireless communication device by a user so as to improve the availability and the reliability of the product in use.

The technical solution of the present invention is as follows: an intelligent terminal that allows for replacement of a wireless communication device by a user, comprising an intelligent terminal body and a wireless communication device, a SIM card being installed in the wireless communication device, wherein: a slot for accommodating the wireless communication device to be inserted is disposed at a side of the intelligent terminal body, the wireless communication device is detachably inserted in the slot and connected to the intelligent terminal body via an interface, and the outer surface of the wireless communication device matches with the outer surface of the intelligent terminal body.

Preferably, the edge at the opening side of the slot partially extends inwards to the bottom surface of the intelligent terminal body to form a first notch for attaching and detaching the SIM card therethrough.

Preferably, the wireless communication device comprises a holder for fixing the SIM card, the holder is formed as a bridge-type fixing holder, and the wireless communication device provides a second notch in the sidewall of the front end thereof so that the SIM card can be plugged into and detached from a side of the wireless communication device when the wireless communication device is connected to the intelligent terminal body.

Preferably, the length of the first notch matches with the length of the SIM card, and the width of the first notch matches with the length of the holder.

Preferably, the wireless communication device comprises a metallic top cover, a plastic mid-frame, a metallic bottom cover and a interior printed circuit board (PCB), and the top cover serves as a shielding cover to cover regions of the PCB other than the SIM card and the holder thereof, and is connected to a ground of the PCB via a grounding shrapnel or a conductive foam.

Preferably, the top cover and the bottom cover are both made of a stainless steel coils having a thickness of 0.1 mm~0.4 mm and are formed through impact briquetting.

Preferably, an antenna connected with the PCB is disposed on the outer wall of the front end of the mid-frame.

Preferably, the intelligent terminal further comprises a back shell fitted over the bottom of the intelligent terminal body with the periphery of the back shell covering the outer surface of the wireless communication device.

Preferably, the wireless communication device has a 3G chip or an LTE chip built therein, and an interface where the wireless communication device connects to the intelligent terminal body is an Mini PCI E interface.

Preferably, the intelligent terminal is a tablet computer.

Because the intelligent terminal that allows for replacement of a wireless communication device by a user adopts a wireless communication device whose outer surface matches with an outer surface of an body of the intelligent terminal, the wireless network accessing function of the ultrathin intelligent terminal (e.g., a tablet computer) is ensured even when no WiFi or 4G network resources are available, and this minimizes the consumer's cost. Meanwhile, comparing with the external wireless network accessing devices which has protruding part, this intelligent terminal can prevent the wireless network accessing device from being subjected to external impact and the consequent damage on the interface, so the availability and the reliability of the product in use are greatly improved. Moreover, the detachable wireless communication device also makes it convenient for the user to choose different kinds of wireless network accessing devices freely.

DETAILED DESCRIPTION

Hereinbelow, particular implementations and embodiments of the present invention will be detailed with reference to the attached drawings. However, these embodiments described herein are only intended to explain the present invention but not to limit the present invention.

Figure 1:
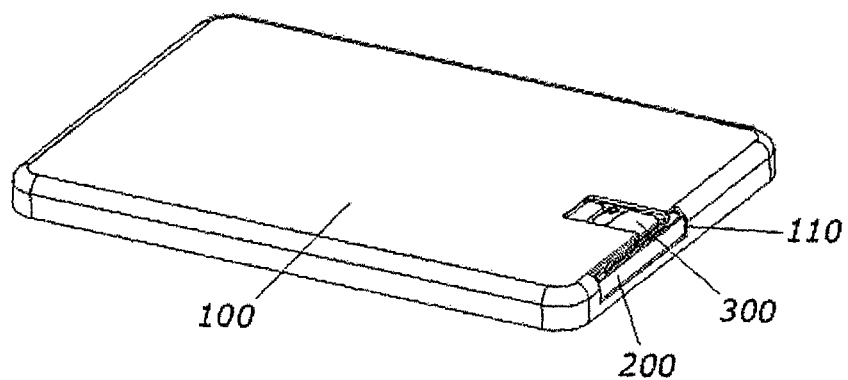
FIG. 1 is a schematic back view of an intelligent terminal of the present invention when a back shell thereof is removed.

The intelligent terminal of the present invention refers to an ultra-thin intelligent terminal that supports a WiFi network accessing function free of charge such as a tablet computer, an intelligent TV set or the like. FIG. 1 is a schematic back view of the intelligent terminal of the present invention with a back shell thereof being removed. Specifically, the intelligent terminal comprises an intelligent terminal body 100 and a wireless communication device 200. A SIM (Subscriber Identity Module) card 300 is disposed in the wireless communication device 200. A slot 110 is disposed in a side surface of the intelligent terminal body 100 to accommodate the wireless communication device 200 to be inserted therein. The wireless communication device 200 is connected to the intelligent terminal body 100 via an interface. An outer surface of the wireless communication device 200 matches with an outer surface of the intelligent terminal body 100; for example, the outer surface of the wireless communication device 200 is flush with that of the intelligent terminal body 100, forms a portion of the side surface or even a portion of the bottom surface of the intelligent terminal body 100, or extends beyond the outer surface of the intelligent terminal body 100.

When the user changes from an environment having WiFi network resources to an environment without WiFi network resources or from an environment having a 4G network to an environment having no 4G network, the tablet computer of the user will still be able to wirelessly connect to the Internet through the wireless communication device 200, which greatly improves utility of the tablet computer.

As compared to the tablet computers in the prior art, the intelligent terminal that allows for replacement of a wireless communication device by a user according to the present invention adopts a wireless communication device whose outer surface matches with an outer surface of an shell of the intelligent terminal, so the wireless network accessing function of the ultra-thin intelligent terminal (e.g., a tablet computer) is ensured even when no WiFi or 4G network resources are available. Meanwhile, comparing with the external wireless network accessing devices which has protruding part, this intelligent terminal can prevent the wireless network accessing device from being subjected to external impact and the consequent damage on the interface, so the availability and the reliability of the product in use are greatly improved. Moreover, the detachable wireless communication device also makes it convenient for the user to choose different kinds of wireless network accessing devices freely.

Figure 2:
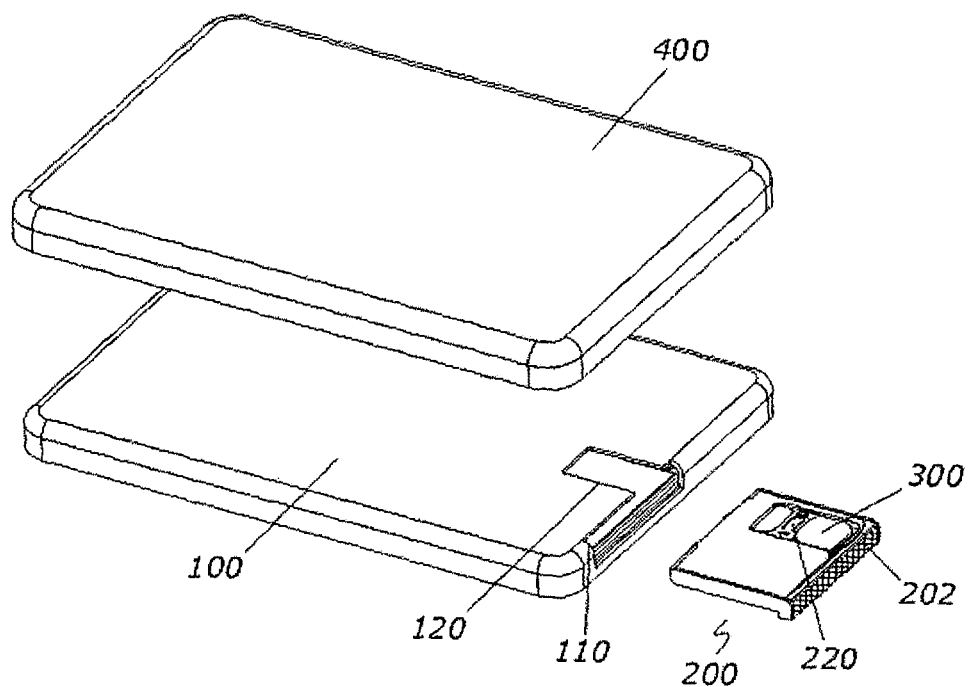
FIG. 2 is a schematic exploded view of the intelligent terminal of the present invention.

A preferred embodiment of the intelligent terminal of the present invention will be described with reference to FIG. 2. FIG. 2 is a schematic exploded view of the intelligent terminal of the present invention. The intelligent terminal further comprises a back shell 400 fitted over the bottom of the intelligent terminal body 100 with the periphery of the back shell 400 covering the outer surface of the wireless communication device 200. With the protection from the back shell 400, it becomes further less likely for the wireless communication device 200 to be damaged due to external impacts, and this completely ensures the availability and the reliability of the product in use.

Further, the edge at the opening side of the slot 110 partially extends inwards to the bottom surface of the intelligent terminal body 100 to form a first notch 120 for attaching or detaching the SIM card 300 therethrough. Thus, the SIM card 300 inserted in the intelligent terminal will be partially exposed from the surface of the intelligent terminal body 100 so that the SIM card 300 can be attached and detached without removing the wireless communication device 200. This can prevent frequent plugging and removal of the wireless communication device 200 to prolong the service life of the product.

Preferably, the wireless communication device 200 comprises a holder 220 for fixing the SIM card 300, which is optionally a bridge-type fixing holder; and a second notch 202 is disposed in the sidewall of the front end of the wireless communication device 200 so that the SIM card 300 can be plugged into or removed from the side surface of the wireless communication device 200 when the wireless communication device 200 is connected to the intelligent terminal body 100.

Specifically, the length of the first notch 120 matches with the length of the SIM card 300, and the width of the first notch 120 matches with the length of the holder 220, which helps to make the volume of the wireless communication device 200 even smaller.

Figure 3:
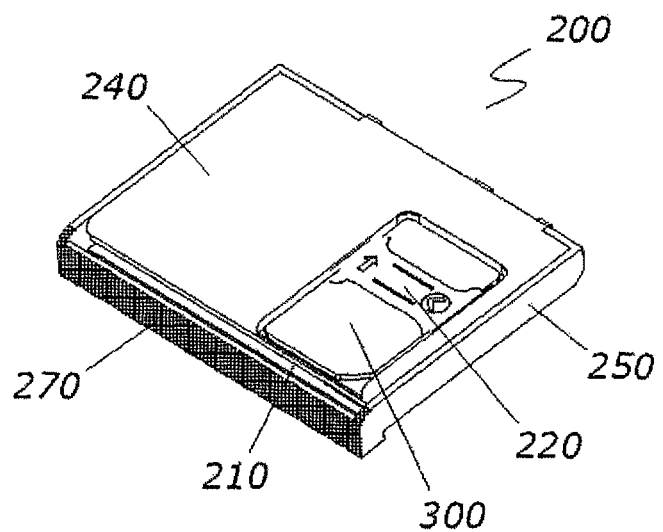
FIG. 3 is a schematic enlarged front perspective view of a wireless communication device used in the intelligent terminal of the present invention.
Figure 4:
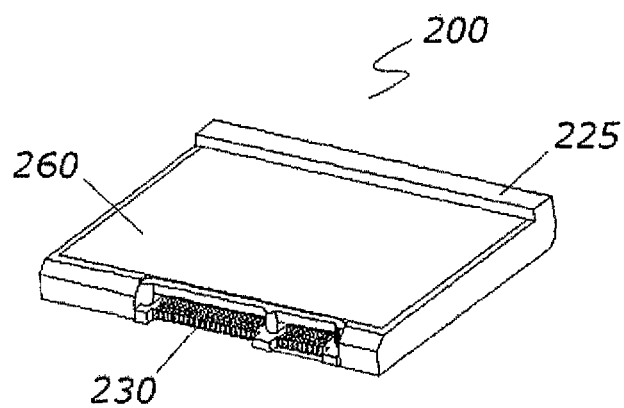
FIG. 4 is a schematic enlarged back perspective view of the wireless communication device used in the intelligent terminal of the present invention.

FIG. 3 is a schematic enlarged front perspective view of the wireless communication device used in the intelligent terminal of the present invention, and FIG. 4 is a schematic enlarged back perspective view of the wireless communication device used in the intelligent terminal of the present invention. As shown in FIG. 3 and FIG. 4, in order to make the wireless communication device 200 thinner to satisfy the design requirements of the ultra-thin intelligent terminal body 100, the wireless communication device 200 comprises a metallic top cover 240, a plastic mid-frame 250, a metallic bottom cover 260, and a interior printed circuit board (PCB) 210. The top cover 240 serves as a shielding cover to cover regions of the PCB 210 other than the SIM card 300 and the holder 220 thereof, and is connected to a ground of the PCB 210 via a grounding shrapnel or a conductive foam (not shown).

Specifically, the inner wall of the top cover 240 is connected to the ground of the PCB 210 via the grounding shrapnel or the conductive foam to improve the anti-static performance of the product. The grounding shrapnel or the conductive foam may be disposed at a corner of the PCB 210 to avoid occupation of the space on the PCB 210, which allows the wireless communication device to be made even smaller.

Preferably, the top cover 240 and the bottom cover 260 are both made of a stainless steel sheets or coiled material having a thickness of 0.1 mm~0.4 mm and preferably 0.2 mm through impact briquetting. The reason why the metallic top cover 240 and the metallic bottom cover 260 are used as portions of the wireless communication device 200 lies in that, the metallic top cover 240 can serve as a shielding cover of the chip; and moreover, a plastic material can only be formed to have a wall-thickness of at least 0.8 mm, but a metal material can be formed to have a wall-thickness of 0.1 mm~0.4 mm. Taking a thickness of 0.2 mm of the metallic top cover 240 and the metallic bottom cover 260 as an example, the overall thickness of the product can be reduced by 1.2 mm.

As shown in FIG. 3, an antenna 270 connected with the PCB 210 is disposed on an outer wall of a front end of the mid-frame 250. The antenna 270 is disposed outwards to better receive the network signals; and by means of the plastic mid-frame 250, the antenna 270 can also be fully isolated from the metallic top cover 240 so as to minimize the influence of the stainless steel shell on the performances of the antenna 270.

Preferably, the antenna 270 includes not limited to a LDS (Laser Direct Structure) antenna formed on the outer wall of the front end of the mid-frame 250 through laser engraving and chemical plating, but also an FPC (Flexible Printed Circuit Board) antenna, and so on. The so-called LDS antenna is an antenna which is a three-dimensional (3D) perspective circuit having the electronical function, and is formed on the surface of the plastic shell formed by injection moduling by the methods of metallization, such as laser engraving and chemical plating.

As shown in FIG. 4, the wireless communication device 200 may have a 3G chip or an LTE chip (not shown) built therein. The interface 230 where the wireless communication device 200 connects to the intelligent terminal body may be formed solely as an Mini PCI E interface so that different kinds of wireless communication devices 200 are connected with the intelligent terminal all through a sole kind of interface 230, which makes it convenient for the user to choose different kinds of wireless network accessing devices freely.

Preferably, at the bottom of the front end thereof, the wireless communication device 200 provides a protruding portion 225 that protrudes from the bottom surface of the wireless communication device 200 so that the ultra-thin wireless communication device 200 can be removed from the slot of the intelligent terminal body. Meanwhile, through disposition of the protruding portion 225, more space will be available for design of the LDS antenna so that a better signal transmission effect can be obtained for wireless network accessing.

It shall be appreciated that, what described above are only preferred embodiments of the present invention but are not intended to limit the scope of the present invention. Accordingly, additions, deletions, substitutions, alterations or modifications may be made by those of ordinary skill in the art within the spirits and principles of the present invention, and all these additions, deletions, substitutions, alterations or modifications shall also fall within the scope of the present invention.

What is claimed is:

1. An intelligent terminal that allows for replacement of a wireless communication device by a user, comprising an intelligent terminal body and the wireless communication device, a SIM card being installed in the wireless communication device, wherein:
    a slot for accommodating the wireless communication device to be inserted is disposed at a side of the intelligent terminal body;
    the wireless communication device is detachably inserted in the slot and connected to the intelligent terminal body via an interface;
    an outer surface of the wireless communication device matches with an outer surface of the intelligent terminal body;
    an edge at an opening side of the slot partially extends inwards to a bottom surface of the intelligent terminal body to form a first notch for attaching and detaching the SIM card therethrough;
    the wireless communication device comprises a holder for fixing the SIM card, and the holder is formed as a bridge-type fixing holder;
    the wireless communication device provides a second notch in a sidewall of a front end thereof so that the SIM card can be plugged into and detached from a side of the wireless communication device when the wireless communication device is connected to the intelligent terminal body; and
    a length of the first notch matches with a length of the SIM card, and a width of the first notch matches with a length of the holder such that the SIM card and the holder thereof inserted in the intelligent terminal are exposed from the intelligent terminal body;
    wherein the wireless communication device comprises a metallic top cover, a plastic mid-frame, a metallic bottom cover and an interior printed circuit board (PCB), and the top cover serves as a shielding cover to cover regions of the PCB other than the SIM card and the holder thereof, and is connected to a ground of the PCB via a grounding shrapnel or a conductive foam;
    wherein a front end of the mid-frame comprises a protruding portion that protrudes from a bottom surface of the mid-frame, and an antenna connected to the PCB is disposed on an outer wall of the front end of the mid-frame; wherein the antenna is a LDS (Laser Direct Structure) antenna which is formed on a surface of the outer wall of the front end of the mid-frame.

2. The intelligent terminal that allows for replacement of a wireless communication device by a user of claim 1, wherein the top cover and the bottom cover are both made of a stainless steel coils having a thickness of 0.1 mm~0.4 mm and are formed through impact briquetting.

3. The intelligent terminal that allows for replacement of a wireless communication device by a user of claim 1, further comprising a back shell fitted over a bottom of the intelligent terminal body with a periphery of the back shell covering the outer surface of the wireless communication device.

4. The intelligent terminal that allows for replacement of a wireless communication device by a user of claim 1, wherein the wireless communication device has a 3G chip or an LTE chip built therein, and the interface where the wireless communication device connects to the intelligent terminal body is an Mini PCI E interface.

5. The intelligent terminal that allows for replacement of a wireless communication device by a user of claim 1, wherein the intelligent terminal is a tablet computer.

* * * * *